United States Patent
Sexton et al.

(10) Patent No.: US 6,829,761 B1
(45) Date of Patent: Dec. 7, 2004

(54) METHOD AND APPARATUS FOR MANAGING SHARED MEMORY IN A RUN-TIME ENVIRONMENT

(75) Inventors: Harlan Sexton, Menlo Park, CA (US); David Unietis, Menlo Park, CA (US); Peter Benson, Boulder, UT (US); Mark Jungerman, San Francisco, CA (US); Scott Meyer, Pacifica, CA (US); David Rosenberg, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/512,618

(22) Filed: Feb. 25, 2000

Related U.S. Application Data (60) Provisional application No. 60/160,759, filed on Oct. 21, 1999.

(51) Int. Cl.[7] .................................................. G06F 9/44
(52) U.S. Cl. .................. 717/165; 717/162; 717/164; 717/166; 717/167; 719/312
(58) Field of Search ................................. 717/162, 164, 717/166, 167, 165; 709/316, 312, 315; 719/316, 312, 315

(56) References Cited

U.S. PATENT DOCUMENTS

| | | | | | |
|---|---|---|---|---|---|
| 4,539,637 A | * | 9/1985 | DeBruler | .................... | 709/312 |
| 5,369,766 A | * | 11/1994 | Nakano et al. | ............. | 717/162 |
| 5,442,764 A | * | 8/1995 | Einhorn et al. | ............. | 717/139 |
| 5,729,739 A | * | 3/1998 | Cantin et al. | ................ | 709/316 |
| 5,805,896 A | * | 9/1998 | Burgess | ....................... | 717/166 |
| 5,884,316 A | * | 3/1999 | Bernstein et al. | ........ | 707/103 R |
| 5,898,875 A | * | 4/1999 | Nakamura et al. | ........... | 717/165 |
| 5,913,029 A | * | 6/1999 | Shostak | ....................... | 709/203 |
| 5,966,702 A | * | 10/1999 | Fresko et al. | .................. | 707/10 |
| 5,970,248 A | * | 10/1999 | Meier | ......................... | 717/125 |
| 5,991,541 A | * | 11/1999 | Ozalp | ......................... | 717/164 |
| 6,009,266 A | * | 12/1999 | Brownell et al. | ........... | 709/315 |
| 6,052,528 A | * | 4/2000 | Dechamboux | .............. | 717/116 |
| 6,067,577 A | * | 5/2000 | Beard | ......................... | 709/331 |
| 6,199,196 B1 | * | 3/2001 | Madany et al. | .............. | 717/165 |
| 6,202,208 B1 | * | 3/2001 | Holiday, Jr. | ................. | 717/166 |
| 6,243,709 B1 | * | 6/2001 | Tung | .......................... | 707/203 |
| 6,349,344 B1 | * | 2/2002 | Sauntry et al. | ............. | 709/332 |
| 6,374,268 B1 | * | 4/2002 | Testardi | ...................... | 707/205 |
| 6,430,564 B1 | * | 8/2002 | Judge et al. | ................. | 707/100 |
| 6,519,594 B1 | * | 2/2003 | Li | ............................... | 709/201 |

* cited by examiner

*Primary Examiner*—Todd Ingberg
*Assistant Examiner*—Qamrun Nahar
(74) *Attorney, Agent, or Firm*—Ditthavong & Carlson, P.C.

(57) ABSTRACT

A method and apparatus for managing a run-time environment is provided for improving performance and scalability of networked computer systems. In one example of the invention, a method starts by loading a class file, the class file specifying a class that includes a static class variable and a static initializer to initialize the static class variable. The static initializer is then invoked to initialize the static class variable. The class and the initialized static class variable are then saved in a second class file. The second class file is then loaded into a shared memory, the second class file including the class and the initialized static class variable.

42 Claims, 6 Drawing Sheets

METHOD AND APPARATUS FOR MANAGING SHARED MEMORY IN A RUN-TIME ENVIRONMENT

RELATED APPLICATIONS

The present application claims the benefit of the following U.S. Provisional Patent Applications, the contents of all of which are incorporated by reference in their entirety:

- U.S. Provisional Patent Application Ser. No. 60/160,759 entitled USE OF A JAVA VM INSTANCE AS THE BASIC UNIT OF USER EXECUTION IN A SERVER ENVIRONMENT, filed on Oct. 21, 1999 by Harlan Sexton et al.;
- U.S. Provisional Patent Application Ser. No. 60/185,136 entitled MEMORY MANAGEMENT USING MIGRATION FOR A RUN-TIME ENVIRONMENT, filed on Feb. 25, 2000 by Harlan Sexton et al.;
- U.S. Provisional Patent Application Ser. No. 60/185,139 entitled METHOD AND ARTICLE FOR MANAGING REFERENCES BETWEEN OBJECTS IN MEMORIES OF DIFFERENT DURATIONS IN A RUN-TIME ENVIRONMENT, filed on Feb. 25, 2000 by Harlan Sexton;
- U.S. Provisional Patent Application Ser. No. 60/185,138 entitled STATIC OBJECT SYSTEM AND METHODOLOGY FOR IMPLEMENTING A RUN-TIME ENVIRONMENT, filed on Feb. 25, 2000 by Harlan Sexton et al.;
- U.S. Provisional Patent Application Ser. No. 60/185,134 entitled AURORA NATIVE COMPILATION, filed on Feb. 25, 2000 by Dmitry Nizhegorodov;
- U.S. Provisional Patent Application Ser. No. 60/185,137 entitled ACCESSING SHORTER-DURATION INSTANCES OF ACTIVATABLE OBJECTS BASED ON OBJECT REFERENCES STORED IN LONGER-DURATION MEMORY, filed on Feb. 25, 2000 by Harlan Sexton et al.; and
- U.S. Provisional Patent Application Ser. No. 60/185,135 entitled HANDLING CALLOUTS MADE BY A MULTI-THREADED VIRTUAL MACHINE TO A SINGLE THREADED ENVIRONMENT, filed on Feb. 25, 2000 by Scott Meyer.

The present application is related to the following commonly-assigned, co-pending U.S. patent applications, the contents of all of which are incorporated by reference in their entirety:

- U.S. patent application Ser. No. 09/248,295 entitled MEMORY MANAGEMENT SYSTEM WITHIN A RUN-TIME ENVIRONMENT, filed on Feb. 11, 1999 by Harlan Sexton et al.;
- U.S. patent application Ser. No. 09/248,291 entitled MACHINE INDEPENDENT MEMORY MANAGEMENT SYSTEM WITHIN A RUN-TIME ENVIRONMENT, filed on Feb. 11, 1999 by Harlan Sexton et al.;
- U.S. patent application Ser. No. 09/248,294 entitled ADDRESS CALCULATION OF INVARIANT REFERENCES WITHIN A RUN-TIME ENVIRONMENT, filed on Feb. 11, 1999 by Harlan Sexton et al.;
- U.S. patent application Ser. No. 09/248,297 entitled PAGED MEMORY MANAGEMENT SYSTEM WITHIN A RUN-TIME ENVIRONMENT, filed on Feb. 11, 1999 by Harlan Sexton et al.;
- U.S. patent application Ser. No. 09/320,578 entitled METHOD AND ARTICLE FOR ACCESSING SLOTS OF PAGED OBJECTS, filed on May 27, 1999 by Harlan Sexton et al.;
- U.S. patent application Ser. No. 09/320,578 entitled METHOD AND ARTICLE FOR MANAGING REFERENCES TO EXTERNAL OBJECTS IN A RUNTIME ENVIRONMENT, filed on May 27, 1999 by Harlan Sexton et al.;
- U.S. patent application Ser. No. 09/512,619 entitled METHOD FOR MANAGING MEMORY USING EXPLICIT, LAZY INITALIZATION IN A RUN-TIME ENVIRONMENT, filed on Feb. 25, 2000 by Harlan Sexton et al.;
- U.S. patent application Ser. No. 09/512,622 entitled METHOD FOR MANAGING MEMORY USING ACTIVATION-DRIVEN INITIALIZATION IN A RUN-TIME ENVIRONMENT, filed on Feb. 25, 2000 by Harlan Sexton et al.;
- U.S. patent application Ser. No. 09/512,621 entitled SYSTEM AND METHOLODGY FOR SUPPORTING A PLATFORM INDEPENDENT OBJECT FORMAT FOR A RUN-TIME ENVIRONMENT, filed on Feb. 25, 2000 by Harlan Sexton et al.; and
- U.S. patent application Ser. No. 09/512,620 entitled USING A VIRTUAL MACHINE INSTANCE AS THE BASIC UNIT OF USER EXECUTION IN A SERVER ENVIRONMENT, filed on Feb. 25, 2000 by Harlan Sexton et al.

FIELD OF THE INVENTION

The present invention relates to computer systems and, more particularly, to memory management of networked computer systems.

BACKGROUND OF THE INVENTION

A dynamic run-time environment for a language such as JAVA™ is responsible for managing memory for objects that are created and destroyed during the execution of a program. An object is an entity that encapsulates data and, in some languages, operations associated with the object. Since the encapsulated data is stored in memory, objects are associated with particular regions of memory that are allocated and deallocated by the dynamic run-time environment.

The state of a program, or "program state," is the set of the objects and the references between the objects that exist at a specific point in time during the execution of the program. A "reference" is used by a run-time environment to identify and ultimately access the region of memory for storing the data of the object. Typically, references between objects in a run-time environment are encoded using machine pointers. A machine pointer is a native datum that contains the address of the object in the main memory, which can be a real memory address or, more commonly, a virtual address on a machine that implements a virtual memory system.

"Virtual memory" refers to memory addressable by a storage allocation technique in which auxiliary storage, such as memory on a hard disk, can be addressed as though it were part of the main memory such as a RAM. More specifically, combinations of hardware, firmware, and operating system cooperate to automatically swap portions of the code and data for an executing process on an as-needed basis. Thus, the virtual address space may be regarded as addressable main memory to a process executing on a computer system that maps virtual addresses into real addresses. The size of the virtual address space is usually limited by the size of a native machine pointer, but not by the actual number of storage elements in main memory.

A virtual address space is typically subdivided into a plurality of fixed-size contiguous sections of memory called "pages." Typically, some of the virtual memory pages for a process are specific to the process and cannot be shared with other processes, but, in some implementations, other virtual memory pages can be shared globally with other processes.

One popular run-time environment is a JAVA™ virtual machine, which supports a platform-independent, object-oriented language developed by Sun Microsystems. In JAVA, the attributes and methods for a class of objects are typically defined in a source file, which is compiled into an architecture-neutral object file containing bytecodes that are interpreted in the virtual machine at the target platform. It is common for objects to reference other objects.

Lately, there has been much interest in using JAVA in a multi-user environment that allows multiple users to connect in separate, concurrent sessions to a server system, such as a relational database system. When designing a run-time environment for such a multi-user environment, scalability in terms of the number of simultaneous users who can establish separate sessions is very important.

A significant constraint for user scalability is the size of the memory "footprint" that each session consumes. For example, a server system may have 100 Mb of memory for supporting all the user sessions. If the session memory footprint is 1 Mb, then only 100 user sessions can be supported at one time. Therefore, it is desirable to reduce the session memory footprint to improve scalability.

One approach for reducing the session memory footprint in a run-time environment is to allocate a single copy of objects, code, and data in a globally shared read-only memory rather than in a session memory that is devoted to a single session. In the example, if 500 Kb of the 1 Mb session memory footprint can be shared between the different sessions, then 500 Kb of the total 100 Mb can be reserved as a global shared read-only memory, and the remaining 99.5 Mb would available for the individual session memories. Since the session memory requirements has dropped to 500 Kb, a total of 199 user sessions can now be supported. Consequently, session memory reduction by using globally shared read-only memory is a promising approach for improving scalability of the multi-user run-time environment.

In many systems, objects, code and data are placed into the globally shared read-only memory only at load time and therefore cannot be modified after being loaded. This approach for reducing the session memory footprint, however, has not conventionally been feasible for those objects that are good candidates for sharing but require construction in a run-time environment even though they are not later modified. Many of these objects, for example, are class objects found in the Java system classes, which construct objects during class initialization (clinit). In addition, other kinds of these objects can be found in user code. Consequently, these objects are not placed in globally shared, read-only memory and consume valuable session memory.

Therefore, there is a need to reduce the session memory footprint for such objects to improve scalability.

SUMMARY OF THE INVENTION

This need and others are addressed by the present invention, in which class objects such as static variables are constructed in a memory as normal, but saved, for example to disk, in their constructed state. The constructed class objects can be loaded, for example from disk, directly into a globally shared memory, thereby avoid subsequent constructions of the same object and improving performance.

Accordingly, one aspect of the invention relates to a method and software for managing a run-time environment. A class file is loaded, the class file specifying a class that includes a static class variable and a static initializer to initialize the static class variable. The static initializer is then invoked to initialize the static class variable. The class and the initialized static class variable are then saved in a second class file. The second class file is then loaded into a shared memory, the second class file including the class and the initialized static class variable.

Another embodiment pertains to a method and software for managing a run-time environment, wherein an object and a name for the object are registered in shared memory. The method starts by specifying an object for migration. In a first process of the method, the object and a name for the object are registered, the object is migrated into a shared memory, and the object is stored in a database. In a second process of the method, the object is loaded into the shared memory from the database based on the name of the object.

Advantageously, the present invention makes it simple for system developers to reduce session footprint size of any large, read-only class state by making better use of shared memory. For objects that are sharable by many users, one copy of the object is put into shared read only memory so that objects do not unnecessarily fill up session memory of each user.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF THE PREFERRED EMBODIMENT

A method and apparatus for managing a run-time environment is disclosed. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
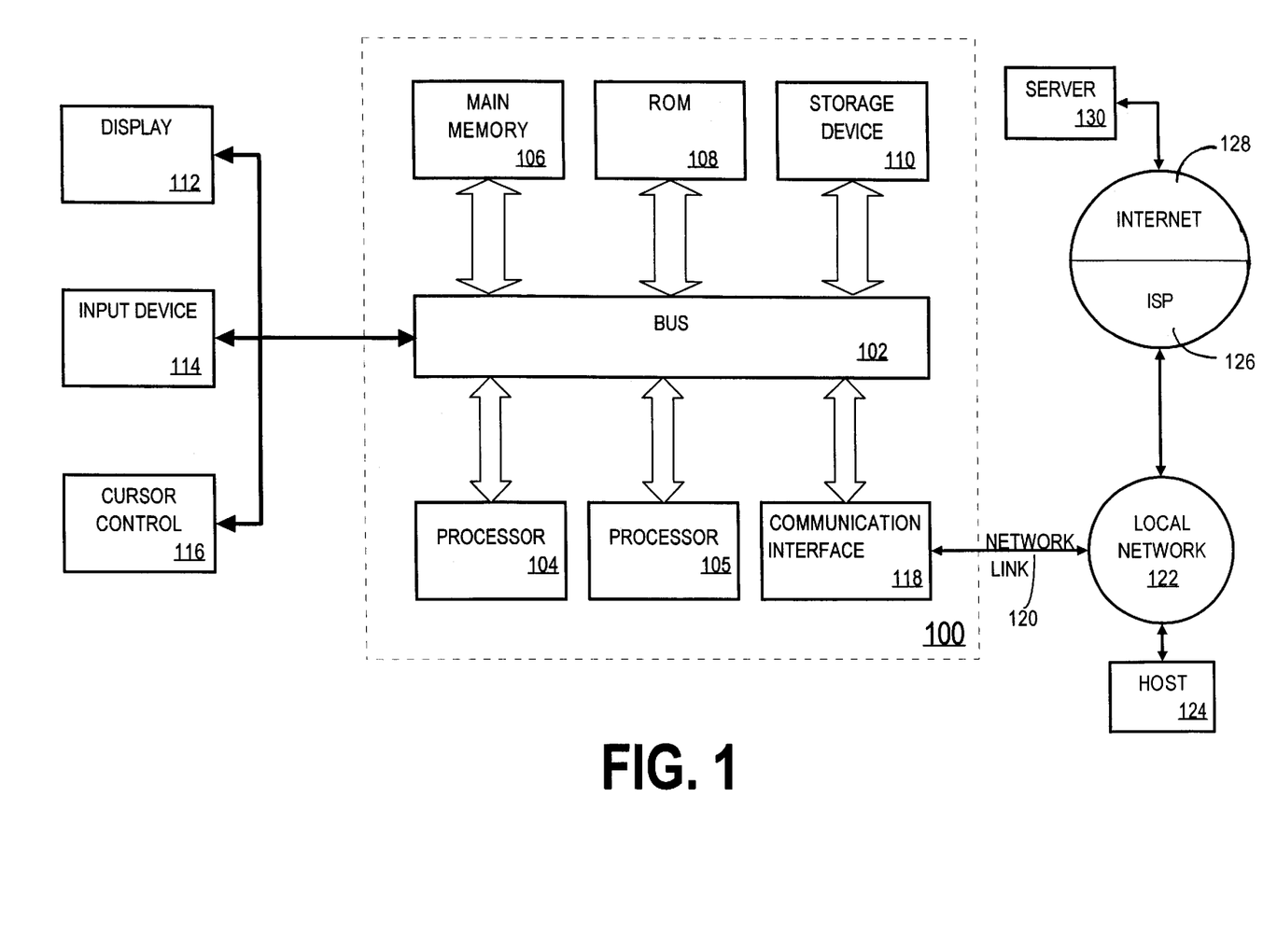
FIG. 1 is a block diagram that illustrates a computer system upon which an embodiment of the invention may be implemented.

FIG. 1 is a block diagram that illustrates a computer system 100 upon which an embodiment of the invention may be implemented. Computer system 100 includes a bus 102 or other communication mechanism for communicating information, and processors 104 and 105 both coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104 and processor 105. Computer system 100 further includes a read only memory (ROM) 108 or other static storage device coupled to bus 102 for storing static information and instructions for processor 104 and processor 105. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for memory management in a run-time environment. According to one embodiment of the invention, managing memory in a run-time environment is provided by computer system 100 in response to processor 104 and/or processor 105 executing one or more sequences of one or more instructions contained in main memory 106. Such instructions may be read into main memory 106 from another computer-readable medium, such as storage device 110. Execution of the sequences of instructions contained in main memory 106 causes processor 104 and/or processor 105 to perform the process steps described herein. Although FIG. 1 depicts a dual processing arrangement with processors 104 and 105, one or more processors in a uni-processing or multi-processing arrangement, respectively, may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 and/or processor 105 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described infra, or any other medium from which a computer can read.

Various forms of computer readable media may be involved in carrying one or more sequences of one or more instructions to processor 104 and/or processor 105 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 and/or processor 105 retrieves and executes the instructions. The instructions received by main memory 106 may optionally be stored on storage device 110 either before or after execution by processor 104 and/or processor 105.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for memory management in a run-time environment as described herein. The received code may be executed by processor 104 as it is received, and/or stored in storage device 110, or other non-volatile storage for later execution. In this manner, computer system 100 may obtain application code in the form of a carrier wave.

"Virtual memory" refers to memory addressable by a storage allocation technique in which auxiliary storage, such as memory in storage device 110, can be addressed as though it were part of the main memory 106. More specifically, combinations of hardware, firmware, and operating system cooperate to automatically swap portions of the code and data for an executing process on an as-needed basis. Thus, the virtual address space may be regarded as addressable main memory to a process executing on a computer system that maps virtual addresses into real addresses. The size of the virtual address space is usually limited by the size of a native machine pointer, but not by the actual number of storage elements in main memory 110.

On many operating systems, a process will utilize a certain amount of virtual memory that no other user process may access in order to provide data security. "Shared memory" refers to the virtual address space on the computer system 100 that is concurrently accessible to a plurality of executing user processes on a processor 104. In some embodiments, shared memory is also accessible to executing user processes on a plurality of processors, such as processors 104 and 105.

"Secondary storage" as used herein refers to storage elements, other than virtual memory, accessible to a process. Secondary storage may be local or networked. Local secondary storage, furnished by storage device 100 on computer system 100, is preferably a random access storage device such as a magnetic or optical disk. Networked secondary storage is provided by storage devices on other computer systems, for example on host 124, accessible over a local area network 122, or server 130, accessible over a wide area network such as the Internet.

Memory Model

Figure 2:
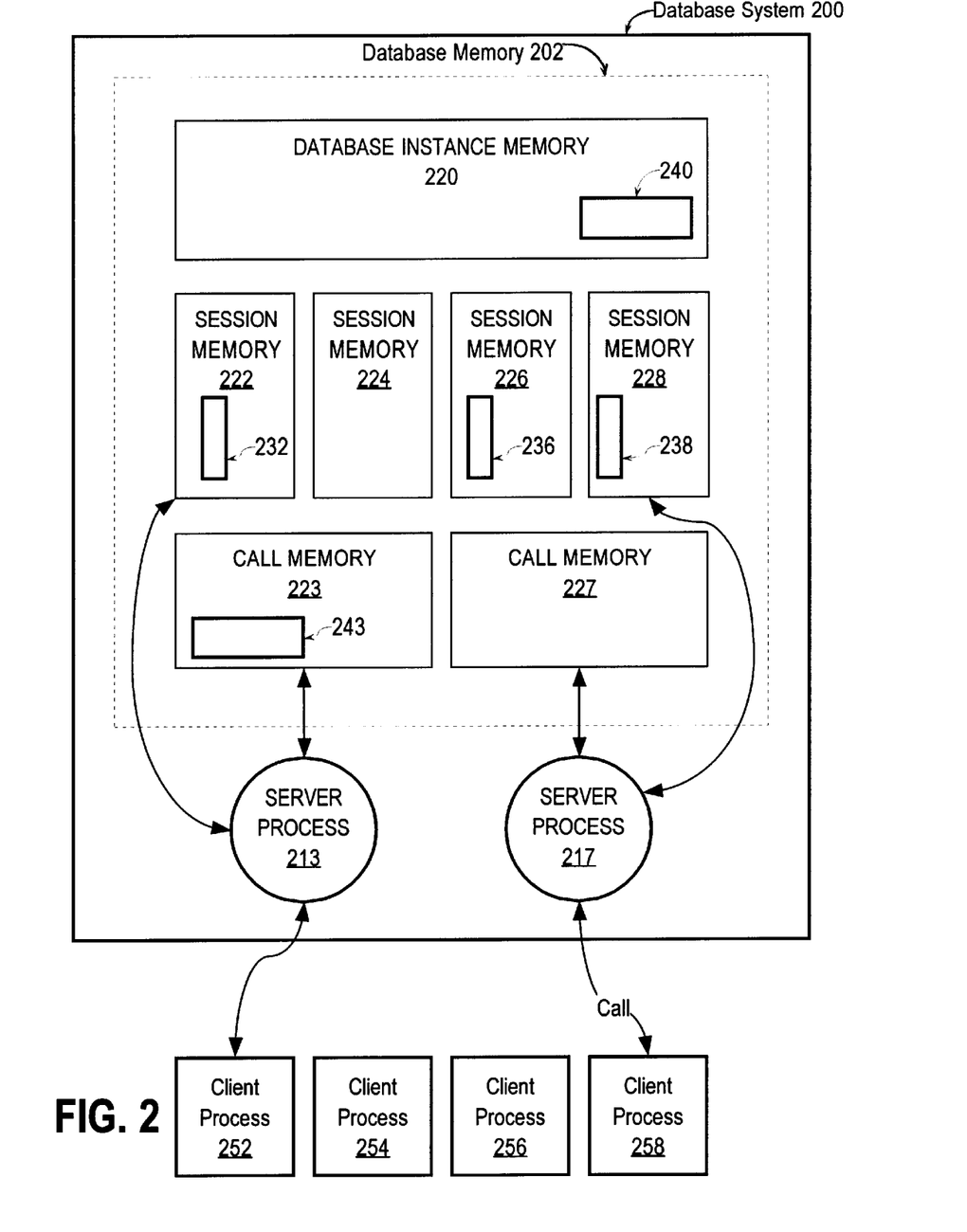
FIG. 2 schematically illustrates a database system with which a run-time environment for a language such as Java is used.

FIG. 2 schematically illustrates a database system 200 with which a run-time environment for a language such as Java is used. In the illustrated configuration, client processes 252, 254, 256, and 258 establish database sessions with the database system 200. A database session refers to the establishment of a connection between a client and a database system through which a series a calls may be made. As long as the client remains connected in the database session, the client and the associated database session are referred to as being active. Active clients can submit calls to the database system 200 to request the database system 200 to perform tasks. One example of a call is a query in accordance with the Structured Query Language (SQL), and another example is a method invocation of a Java object or class, defined for performing a database task for database system 200.

Database system 200 comprises, among other components, a database memory 202 for storing information useful for processing calls and a number of server processes 213 and 217 for handling individual calls. The database memory 202 includes various memory areas used to store data used by server processes 213 and 217. These memory areas include a database instance memory 220, session memories 222, 224, 226, and 228, and call memories 223 and 227. It is to be understood that the number of the session memories and call memories in FIG. 2 is merely illustrative and, in fact, the number of such memories will vary over time as various clients make various calls to the database system 200.

The database instance memory 220 is a shared memory area for storing data that is shared concurrently by more than one process. For example, shared memory area may be used store the read-only data and instructions (e.g. bytecodes of Java classes) that are executed by the server processes 213 and 217. The database instance memory 220 is typically allocated and initialized at boot time of the database system 200, before clients connect to the database system 200.

When a database session is created, an area of the database memory 202 is allocated to store information for the database session. As illustrated in FIG. 2, session memories 222, 224, 226, and 228 have been allocated for clients 252, 254, 256, and 258, respectively, for each of which a separate database session has been created. Session memories 222, 224, 226, and 228 are a shared memory used to store static data, i.e., data associated with a user that is preserved for the duration of a series of calls, especially between calls issued by a client during a single database session. Java class variables are one example of such static data.

A call memory, such as call memory 227, is used to store data that is bounded by the lifetime of a call. When client 258 submits a call to the database system 200, one of server processes 213 or 217 is assigned to process the call. For the duration of the call, the server process is allocated a call memory for storing data and other information for use in processing the call. For example, server process 217 uses call memory 227 and session memory 228 for processing a call submitted by client process 258.

At any given time, a server process is assigned to process a call submitted by a single client. After the server process completes its processing of a call from one client, the server process is free to be assigned to respond to the call of another client. Thus, over a period of time, a server process may be assigned to process calls from multiple clients, and a client may use multiple server processes to handles its various calls. At any given time, the number of calls requiring execution by a server process is typically much fewer than the current number of active clients. Thus, database system 200 is typically configured to execute fewer server processes than the maximum number of active clients.

Pre-Constructing Objects

Figure 3:
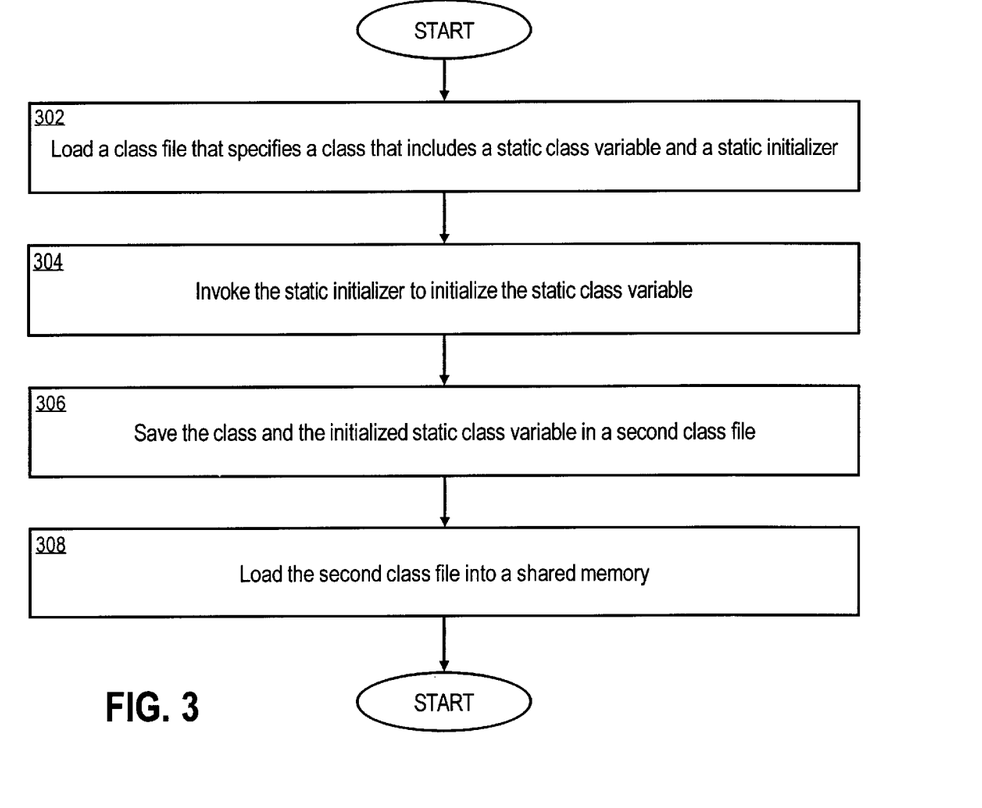
FIG. 3 is a flowchart for a method of managing a run-rime environment.

One embodiment of the invention is directed to pre-constructing static class variables that are good candidates for sharing because they are not modified after construction but require execution of a "static initializer" to be properly constructed. One example is a string conversion table for different character sets. FIG. 3 is a flowchart for a method of managing a run-time environment, carried out during construction of objects for later loading to a shared read-only (SRO) object memory in a server of the computer system.

At step 302, a class file, which in one embodiment is the compiled form of a Java class, is loaded into the shared read-only object memory, for a specified class. The specified class includes a static class variable and a static initializer, which is used to initialize the static class variable. Although loading a single class file is discussed for purposes of explanation, the present invention is not so limited. In fact, more than one class file may be loaded, and the techniques described herein may be applied to other initialized variables.

In step 304, the static initializer is invoked to construct the static class variable in a writable memory, such as call or session memory. The class along with the initialized static class variable, in step 306, are then saved in a second class file that shadows the class file, with a name related to that of the class file but with a different extension, path, or other filename component. The second class file with the saved, constructed class object is loaded into a globally shared memory in step 308, such as a shared read-only (SRO) object memory. Thus, the values of constructed static class objects can placed into the globally shared memory via the second class file. The process of initializing and saving class objects for later loading in a globally shared memory may be referred to as "predigestion."

Figure 4:
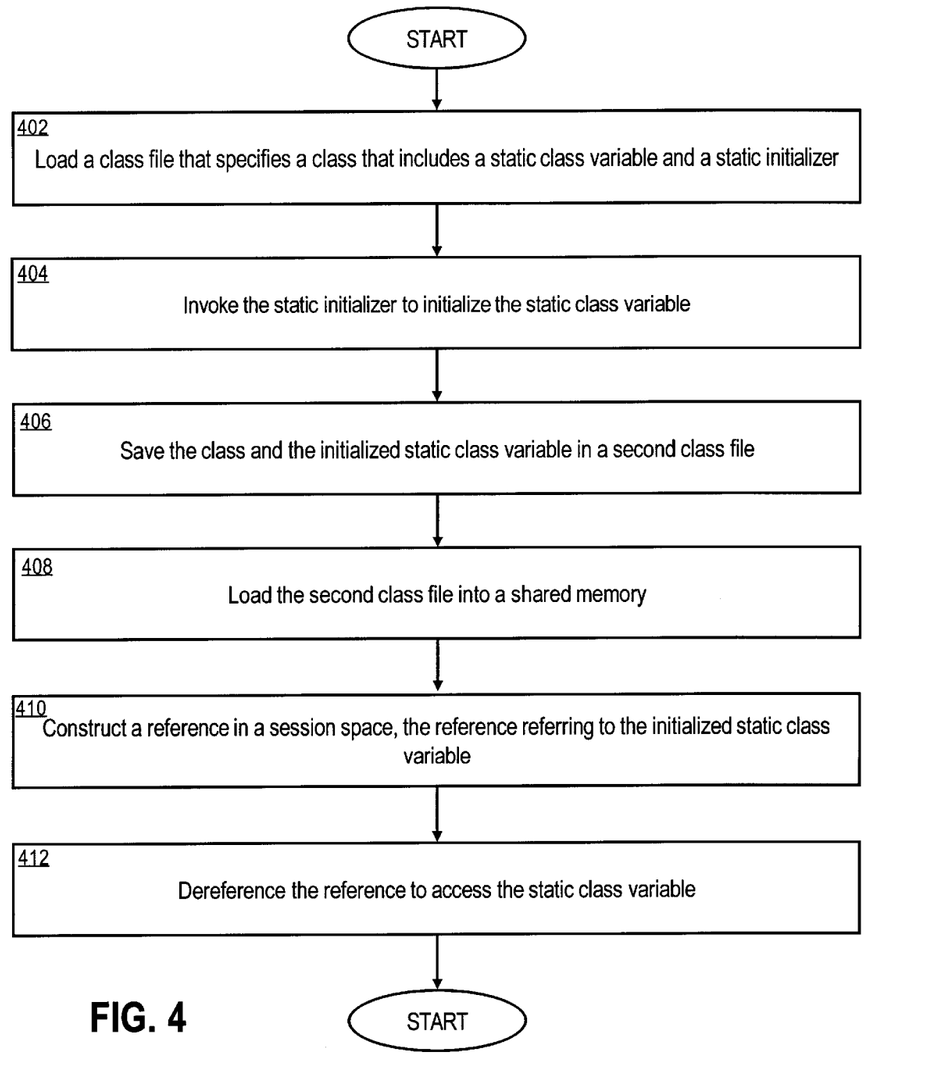
FIG. 4 is a flowchart for a method of managing a run-time environment, including usage of references in session space to access objects in shared memory.

FIG. 4 is a flowchart illustrating the usage of predigested class objects. The operation of FIG. 4 is similar to the method discussed with reference to FIG. 3, but with additional steps. The additional steps include constructing a reference in a session space that refers to the predigested class object in the SRO memory.

In step 402, a class file is loaded into the shared read-only object memory for a particular class. The class that is specified preferably includes a static class variable and a static initializer. In step 404, the static initializer is invoked to initialize the static class variable within the run-time environment. When the static initializer is invoked the static class variable are constructed, possibly calling other functions, obtaining values from the run-time environment, or performing computations. The class along with the initialized static class variable, in step 406, is then saved in a second class file. This second class file, in step 408, is loaded into a shared memory.

Next, in step 410, a reference is constructed in session space. The reference is configured to refer to the initialized static class variable that is saved in SRO object memory. The reference is preferably an external reference (XREF), which is described in greater detail in the commonly-assigned, co-pending U.S. patent application Ser. No. 09/408,847, entitled "A Method and Article for Managing References to External Objects in a Run-Time Environment," filed on Sep. 30, 1999, by Harlan Sexton et al., the contents of which are hereby incorporated by reference. At some later point, in step 412, the reference is dereferenced in order to access the initialized static class variable in SRO memory. Such dereferencing may occur whenever a process of a particular user session needs to access the initialized class variable.

Figure 5:
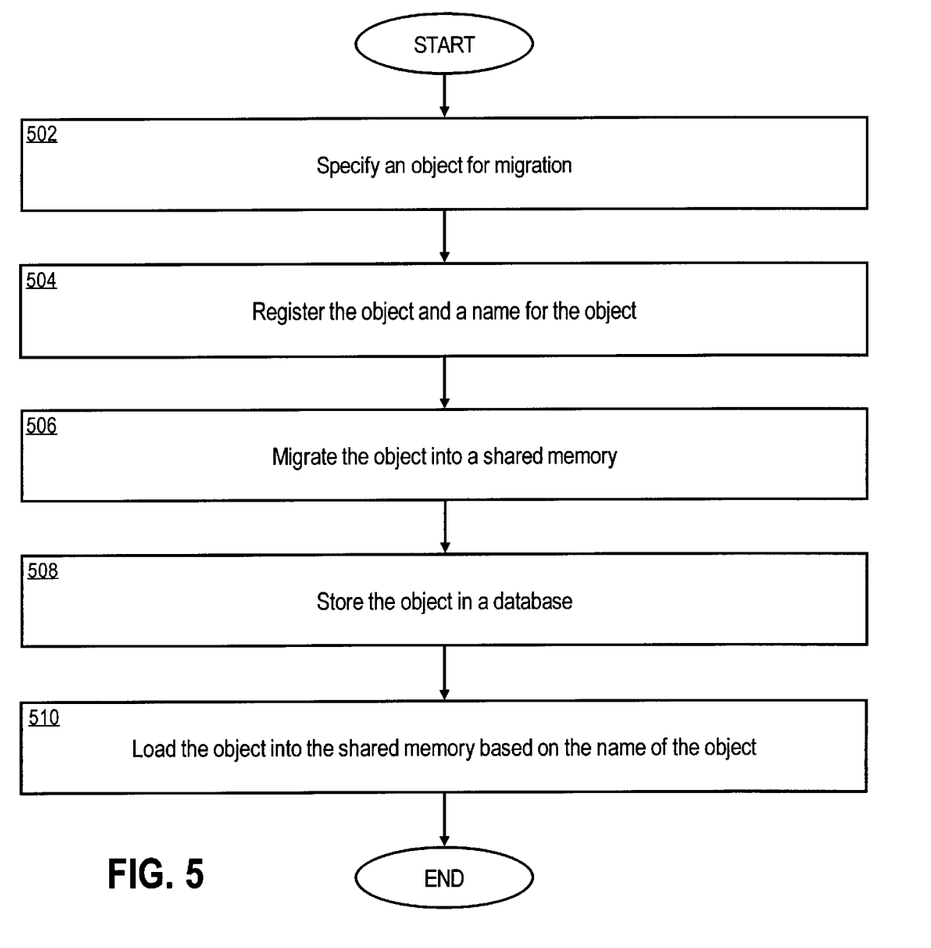
FIG. 5 is a flowchart for a method of managing a run-time environment, wherein an object and a name for the object are registered in shared memory.

Another embodiment of the invention pertains to enabling system administrators or other personnel to maintain a database of objects that have already been constructed, and then can be loaded in a globally shared memory. Referring to FIG. 5, in step 502, the system administrator specifies an object for "SRO migration," for example, from a command line prompt or other interface. An object is suitable for SRO migration when the object, if seen in the scope of another user's session, can be recognized by the other session.

In step 504, the object and a name for the object are registered, the name being used to identify the object. The object, if not already in shared memory, is then migrated into shared memory (step 506), and is stored in a database (step 508). Later, in step 510, the object is loaded from the database into the shared memory by looking up the name of the object in the database. In one embodiment, for example, steps 504, 506, 508 may be performed in a first process by the system administrator, and step 510 may be performed in one or more subsequent processes by other users, thereby saving the overhead involved in constructing the object.

Figure 6:
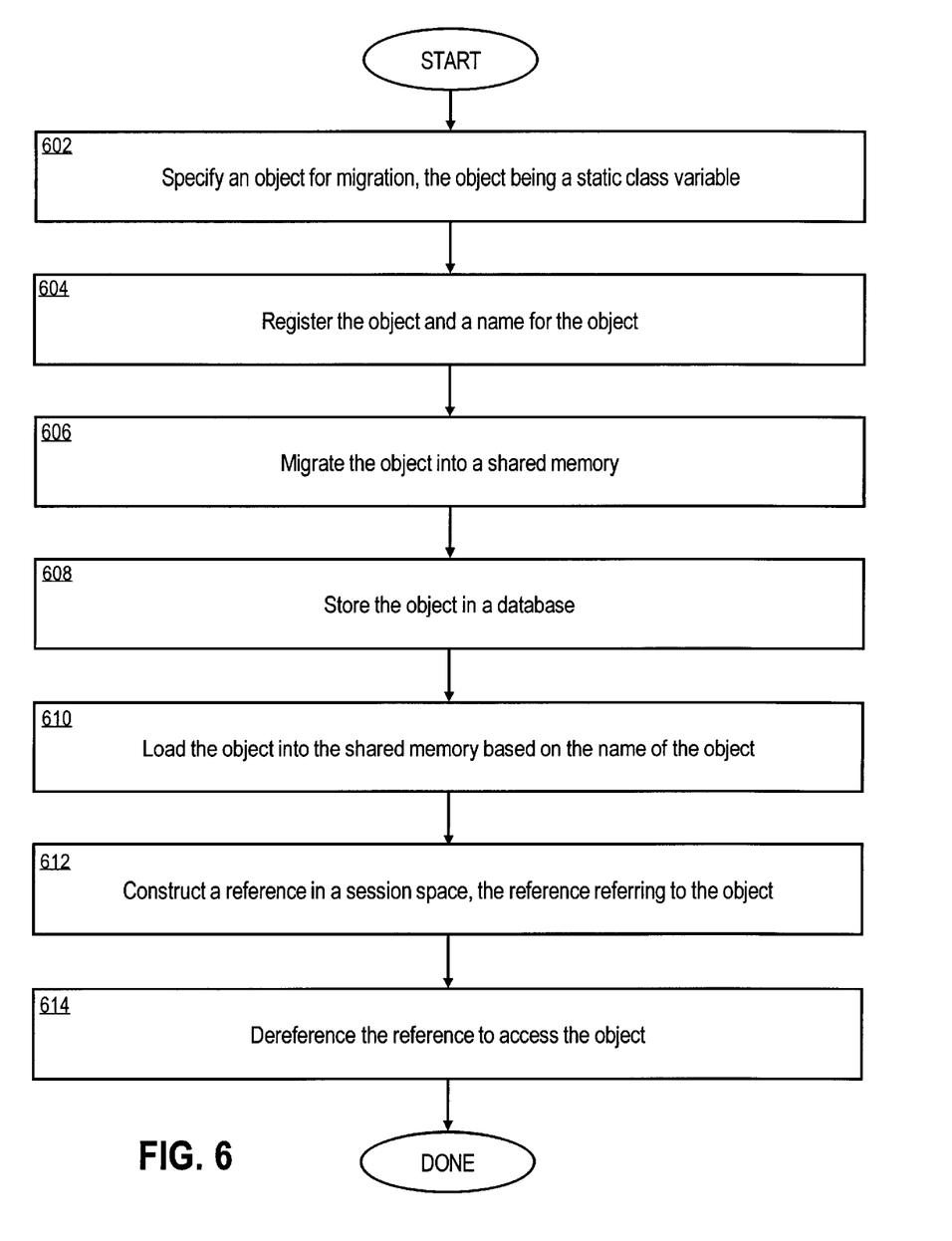
FIG. 6 is a flowchart for a method of managing a run-time environment, wherein an object and the object's name are registered in shared memory, and wherein references in session space are used to access objects in shared memory.

FIG. 6 is a flowchart illustrating the usage of saved objects. The operation of FIG. 6 is similar to the method discussed with reference to FIG. 5, but with additional steps. The additional steps include constructing a reference in a session space that refers to the saved object in the SRO memory.

Starting in step 602, an object is specified for migration. In step 604, the object is registered along with a name for the object. The object, if not already in shared memory, is then migrated into shared memory (step 606), and is stored in a database (step 608). In one embodiment, for example, steps 604, 606, 608 may be performed in a first process by the system administrator, and step 610 may be performed in one or more subsequent processes by other users, thereby saving the overhead involved in constructing the object.

In step 612, a reference is constructed in session space. The reference is configured to refer to the initialized static class variable that is saved in SRO object memory. The reference is preferably an external reference (XREF). In step 614, the reference is dereferenced in order to access the initialized static class variable in SRO memory. Such dereferencing may occur whenever a process of a particular user session needs to access the initialized class variable.

It is important to note that traditional methods of constructing an SRO memory do not construct initialized static variables and other state into a globally shared memory. In accordance with the present invention, however, saved state is loaded globally shared memory, thereby obviating the redundant construction of such state. Thus, a method is hereby provided that, among things, improves performance of server processes.

To illustrate how performance of server may be improved, take a practical example of a web server that has multiple states that the server utilizes in multiple user sessions. These states may include, for example, default settings for the particular language to use during server processes. A web server may have to perform a multitude of database lookups, take strings from a database, and construct numerous Java objects from scratch for every single session. Moreover, the web site is likely to have links that, if activated, create many new and different sessions. This aggregate of active sessions, as a practical matter, involves much run-time overhead. In accordance with an embodiment, this overhead is reduced by loading constructed objects in shared memory. Objects that are suitable for shared memory include, in this example, the default settings that are the same for all running sessions. If these objects are already in memory, the server does not have do multiple database lookups to retrieve needed data, thereby improving performance.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of managing a run-time environment, the method comprising the steps of:

loading a class file, said class file specifying a class that includes a static class variable and a static initializer to initialize the static class variable;

invoking the static initializer to initialize the static class variable;

saving the class and the initialized static class variable in a second class file; and loading the second class file into a shared memory, the second class file including the class and the initialized static class variable.

2. The method of claim 1, further comprising the step of:
constructing a reference in a session space, the reference being constructed to refer to the initialized static class variable.

3. The method of claim 2, wherein the step of constructing a reference in a session space includes the step of configuring the reference to be an external reference.

4. The method of claim 2, the method further comprising the step of:
dereferencing the reference, the dereferencing including accessing the static class variable.

5. The method of claim 2, wherein the session space is an area of memory other than the shared memory, that is specific to a session.

6. The method of claim 1, wherein the shared memory includes virtual memory.

7. The method of claim 1, wherein the second class file is stored on a secondary storage.

8. The method of claim 1, wherein:
the class file has a first file name having a first filename component; and
the second class file has a second file name related to the first file name and having a second filename component different from the first filename component.

9. A method of managing a run-time environment, the method comprising the steps of:
loading a class file from a secondary storage into a shared memory, the class file including a class and an initialized static class variable that is initialized by a static initializer prior to said loading; and
constructing a reference in a session space, the reference being constructed to refer to the initialized static class variable.

10. The method of claim 9, wherein the step of constructing a reference in a session space includes the step of configuring the reference to be an external reference.

11. The method of claim 9, the method further comprising the step of:
dereferencing the reference, the dereferencing including accessing the static class variable.

12. The method of claim 9, wherein the shared memory includes virtual memory.

13. A computer-readable medium bearing instructions for managing a run-time environment, the instructions arranged, when executed by one or more processors, to cause the one or more processors to perform the steps of:
loading a class file, said class file specifying a class that includes a static class variable and a static initializer to initialize the static class variable;
invoking the static initializer to initialize the static class variable;
saving the class and the initialized static class variable in a second class file; and
loading the second class file into a shared memory, the second class file including the class and the initialized static class variable.

14. The computer-readable medium of claim 13, wherein the instructions are further arranged to cause the one or more processors to perform the step of:
constructing a reference in a session space, the reference being constructed to refer to the initialized static class variable.

15. The computer-readable medium of claim 14, wherein the step of constructing a reference in a session space includes the step of configuring the reference to be an external reference.

16. The computer-readable medium of claim 14, wherein the instructions are further arranged to cause the one or more processors to perform the step of:
dereferencing the reference, the dereferencing including accessing the static class variable.

17. The computer-readable medium of claim 14, wherein the session space is an area of memory other than the shared memory, that is specific to a session.

18. The computer-readable medium of claim 13, wherein the shared memory includes virtual memory.

19. The computer-readable medium of claim 13, wherein second class file is stored on a secondary storage.

20. The computer-readable medium of claim 13, wherein:
the class file has a first file name having a first filename component; and
the second class file has a second file name related to the first file name and having a second filename component different from the first filename component.

21. A computer-readable medium bearing instructions for managing a run-time environment, the instructions arranged, when executed by one or more processors, to cause the one or more processors to perform the steps of:
loading a class file from a secondary storage into a shared memory, the class file including a class and an initialized static class variable that is initialized by a static initializer prior to said loading; and
constructing a reference in a session space, the reference being constructed to refer to the initialized static class variable.

22. The computer-readable medium of claim 21, wherein the instructions are further arranged to cause the one or more processors to perform the step of:
constructing a reference in a session space further includes configuring the reference to be an external reference.

23. The computer-readable medium of claim 21, wherein the instructions are further arranged to cause the one or more processors to perform the step of:
dereferencing the reference, the dereferencing including accessing the static class variable.

24. The computer-readable medium of claim 21, wherein the shared memory includes virtual memory.

25. A method of managing a run-time environment, the method comprising the steps of:
loading a class file, said class file specifying a class that includes a static class variable and a static initializer to initialize the static class variable;
invoking the static initializer to initialize the static class variable;
saving the class and the initialized static class variable in a database; and
loading the class and the initialized static class variable into shared memory from the database.

26. The method of claim 25, wherein the shared memory includes virtual memory.

27. The method of claim 25, further comprising the step of:
constructing a reference in a session space, the reference being constructed to refer to the initialized static class variable.

28. The method of claim 27, wherein the step of constructing a reference in a session space includes the step of configuring the reference to be an external reference.

29. The method of claim 27, the method further comprising the step of:

dereferencing the reference, the dereferencing including accessing the static class variable.

30. A method of managing a run-time environment, the method comprising the steps of:

loading a class and an initialized static class variable, that is initialized by a static initializer prior to said loading, from a database into a shared memory; and constructing a reference in a session space, the reference being constructed to refer to the initialized static class variable.

31. The method of claim 30, wherein the shared memory includes virtual memory.

32. The method of claim 30, wherein the step of constructing a reference in a session space includes the step of configuring the reference to be an external reference.

33. The method of claim 30, the method further comprising the step of:

dereferencing the reference, the dereferencing including accessing the static class variable.

34. A computer-readable medium bearing instructions for managing a run-time environment, the instructions arranged, when executed by one or more processors, to cause the one or more processors to perform the steps of:

loading a class file, said class file specifying a class that includes a static class variable and a static initializer to initialize the static class variable;

invoking the static initializer to initialize the static class variable;

saving the class and the initialized static class variable in a database; and loading the class and the initialized static class variable into shared memory from the database.

35. The computer-readable medium of claim 34, wherein the shared memory includes virtual memory.

36. The computer-readable medium of claim 34, wherein the instructions are further arranged to cause the one or more processors to perform the step of:

constructing a reference in a session space, the reference being constructed to refer to the initialized static class variable.

37. The computer-readable medium of claim 36, wherein the step of constructing a reference in a session space includes the step of configuring the reference to be an external reference.

38. The computer-readable medium of claim 36, wherein the instructions are further arranged to cause the one or more processors to perform the step of:

dereferencing the reference, the dereferencing including accessing the static class variable.

39. A computer-readable medium bearing instructions for managing a run-time environment, the instructions arranged, when executed by one or more processors, to cause the one or more processors to perform the steps of:

loading a class and an initialized static class variable, that is initialized by a static initializer prior to said loading, from a database into a shared memory; and constructing a reference in a session space, the reference being constructed to refer to the initialized static class variable.

40. The computer-readable medium of claim 39, wherein the shared memory includes virtual memory.

41. The computer-readable medium of claim 39, wherein the step of constructing a reference in a session space includes the step of configuring the reference to be an external reference.

42. The computer-readable medium of claim 39, wherein the instructions are further arranged to cause the one or more processors to perform the step of:

dereferencing the reference, the dereferencing including accessing the static class variable.

* * * * *